July 18, 1967     C. M. WERNER     3,331,628
ANTIGLARE DEVICE
Filed May 4, 1965
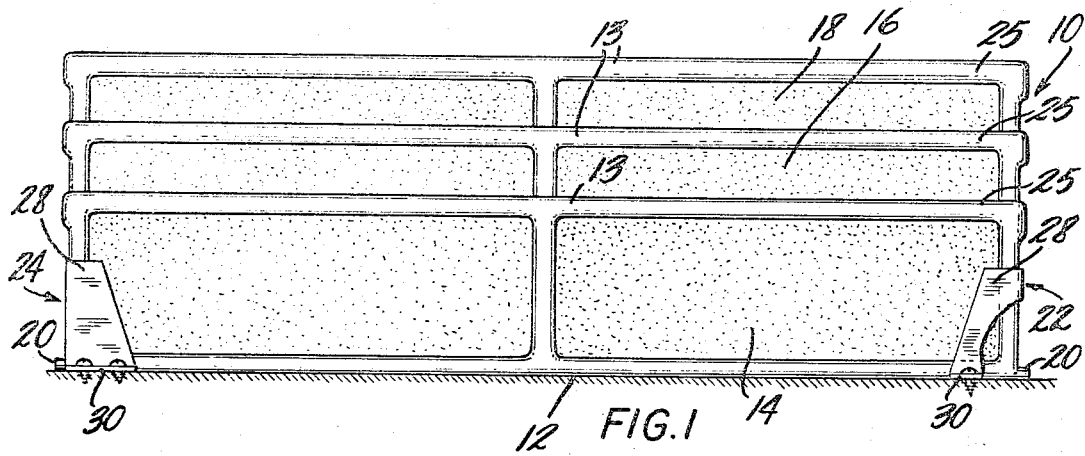
FIG.1
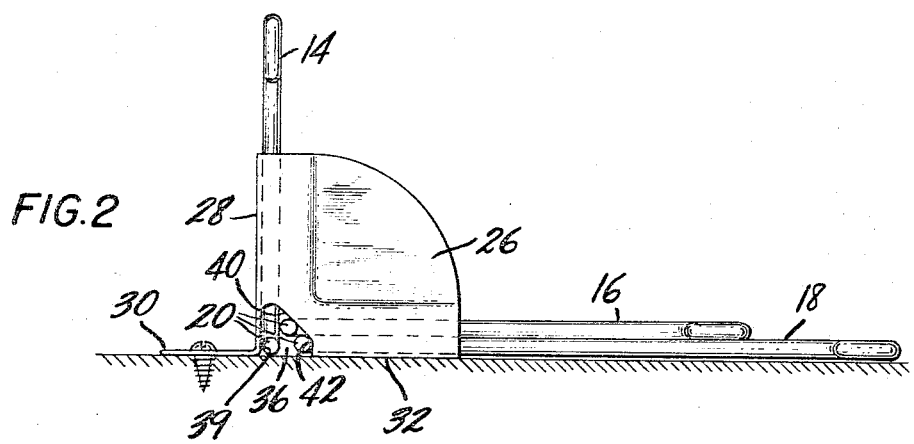
FIG.2
FIG.3
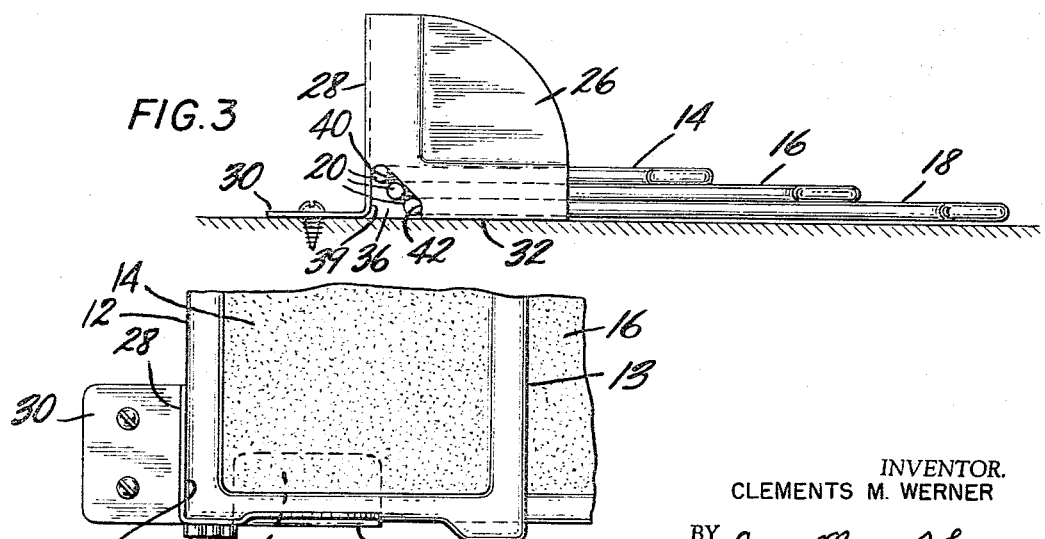
FIG.4
INVENTOR.
CLEMENTS M. WERNER
BY *Eyre, Mann & Lucas*
ATTORNEYS.

United States Patent Office 3,331,628
Patented July 18, 1967

3,331,628
ANTIGLARE DEVICE
Clements M. Werner, 7528 Olcott Ave.,
Hammond, Ind. 46323
Filed May 4, 1965, Ser. No. 453,037
6 Claims. (Cl. 296—97)

This invention relates to an improved antiglare device for automobiles, boats, and planes devised to eliminate the glare of light reflected from a surface such as the hood of a motor vehicle and more specifically to a device having antiglare panels adjusted for the height of the driver of the vehicle. The panels have a novel locking arrangement for holding them in place so they will not be dislodged during any abrupt movement of the vehicle in which the device is used.

The glare caused by the sun or front headlights of approaching cars reflecting from the hood of a car has plagued drivers for many years. The glare also constitutes a hazard to safety. Applicant has devised an antiglare device which can be easily adjusted for the height of the driver and will also remain in position during any abrupt movement of the vehicle. The device is aesthetically appealing and it conveniently fits into the available space.

Up until applicant's invention most of the antiglare devices worked on the principle of a window shade. The shade is lifted up from a housing mounted on the top of the instrument panel and is held in place by arms extending down from the top of the windshield or up from the instrument panel. These devices are difficult to install, difficult to adjust and in some cases impede the driver's vision when they are used.

Applicant has overcome the drawbacks to the earlier devices by using multiple panels which are readily adjustable to the height of the driver by means of simple but highly effective end clips which do not obstruct vision.

A better understanding of the present invention and its advantages can be best understood by reference to the accompanying drawings which illustrate a preferred embodiment of the invention and in which:

FIG. 1 is a driver's view of the device with the three panels in the up position and a partial section through the right end clip, FIG. 2 is a side view of the device showing the smallest panel in the up position and the two longer panels in the down position, FIG. 3 is a side view of the device with all three panels in the down position, and FIG. 4 illustrates a preferred form of end clip.

The panels 10 are of opaque plastic or metal material with bottom edges 12 contoured to conform to the shape of the top of the instrument panel. In the preferred structure shown, a border 13 of relatively thick plastic is provided for rigidity and as a result the central area of the panel is thinned to reduce the bulkiness of the panel.

The first panel 14 which is mounted closest to the driver is the smallest of the three panels. Panels 16 and 18 are progressively larger than panel 14 with panel 18 being larger than panel 16 and being mounted furthest from the driver. It is important to use different size panels in order that the device can be adjusted for tall or short drivers. A single size panel constructed for a short driver will not shield a tall driver from glare whereas the panel constructed for a tall driver will obstruct the vision of a short driver. Since the panels are opaque the height of each of the panels must be controlled so as not to interfere with the driver's vision and still shield the glare from the driver's eyes. Applicant has found that the preferred maximum height of panels 14, 16 and 18 are 2½", 3½" and 4½" respectively. The driver's height corresponding to the size of the panels is as follows:

| Height of driver: | Size of panel, inches |
|---|---|
| 4 ft. 10 in. to 5 ft. 5 in. | 2½ |
| 5 ft. 5 in. to 6 ft. | 3½ |
| 6 ft. to 6 ft. 6 in. | 4½ |

Of course, different size panels can be used and their height will depend on the height of the automobile seats, the height of the driver and the curvature and reflective properties of the motor hood.

Each panel has a pair of projections 20, each of which extend outwardly from the bottom edge at both sides of the panel. The projections 20 are rotatively mounted in a right spring clip 22 and a left spring clip 24. As best shown in FIG. 4 the spring clips 22 and 24 comprise an upright side wall 26 and an upright front wall 28 which forms an angle of about 90° with the side wall 26. A flange 30 extends outwardly from the bottom edge of the front wall 28 and a second flange 32 extends inwardly from the bottom edge of the side wall 26.

In the preferred form of structure shown the side wall 26 is bent slightly inwardly so that the angle between the surface of the side wall and flange 32 is slightly less than 90°. Flange 32 is spaced away from the front wall 28.

An opening 36 is positioned in the side wall 26. The width of the opening corresponds in size to the space between the rear edge of flange 32 and front wall 28. As best shown in FIG. 2 the three panels 14, 16 and 18 are rotatively mounted in the spring clips 22 and 24 by inserting the projections 20 through the opening 36. The width of the projections are such that all three projections fit snugly into the space in opening 36 between flange 32 and front wall 28. Opening 36 is delineated by a rim section 39 which is the edge of front wall 28 and by rim 40 which slopes downwardly away from the front wall 28 toward the flange 32 so that the rim forms an acute angle with the vertical plane of front wall 28. Before the rim 40 actually reaches flange 32 it is terminated by a vertical rim section 42 which is substantially parallel with the front wall 28. The opening 36 is therefore described as having a long side in the rear connected to a short side in front by a downward sloping rim. As shown in FIG. 3 the angle of the slope of rim 40 is such that when each panel is rotated into the down position the top of each of the projections is brought into contact with rim 40 of opening 36. With this construction, when he panels are down, the rim 40 of opening 36 bears against the top of the projections to anchor the panels in place. When the panels are rotated upwardly the projections of panel 14 bear against those of panel 16 which in turn bear against those of panel 18 and the projections of panel 18 pivot against the vertical section 42 of opening 36.

Since side wall 26 is bent slightly inwardly toward flange 32 the side wall bears against the side edges of the panels to hold the panels in either the up or down position or any point in between. Since side wall 26 is attached directly to the front wall 28 the panels can be easily moved from the up or down position without any difficulty even though the side wall is bent inwardly.

When only panel 14 is to be supported in the up position for a short driver, it will be supported by the section 39 of front wall 28 and by the bottom edge of panel 16 (see FIG. 2). When curved panels are used so as to conform to the shape of the instrument panel the opening 36 may be made larger so as to be able to receive the curved panels, otherwise the construction of the spring clips is the same as explained above.

The spring clips 22 and 24 are attached to the top of an instrument panel by permanent fastening such as a screw or a temporary fastening such as a suction cup. In mounting the panels 14, 16 and 18 onto the instrument panel the right or left end clip is first attached to the instrument panel, the projections 20 on one side of the three panels are inserted into the opening 36 and then the other end clip is fitted over the projections at the second end of the panels and the second clip is fastened to the instrument panel. These are the only steps required to install the device.

When the panels are not in use they will lie flat on top of the instrument panel in the downward position (see FIG. 3). The operator is then only required to move one or more of the panels towards him so as to place the panels in an up position when the device is to be used. By mounting the shortest panel close to the driver, and the tallest panel away from the driver, the operator who is over six feet tall will be required to pull all three panels towards him in order for the device to work, whereas the operator who is shorter than 5 ft. 5 in. will only be required to pull the small panel 14 towards him. The driver of medium height will only pull panels 14 and 16 into the up position leaving panel 18 in the down position in order to obtain the desired shielding effect without obstructing his viewing of the road.

Although applicant has shown the device constructed with three panels any number of panels can be used. The panels can also be made of a partially transparent plastic as opposed to the preferred opaque material. In the case of transparent panels, the panels can be made larger since the driver can see through them when they are in the up position.

It will be understood that it is intended to cover all changes and modifications of the preferred form of structure herein chosen for the purpose of illustration which do not constitute departures from the spirit and scope of the invention.

I claim:

1. An antiglare device for a vehicle comprising a plurality of panel members each having projections which extend out from the long axis at the bottom of each panel, a pair of end clips for pivotally mounting said plurality of panel members and for holding said panels in fixed positions, each of said end clips having an opening therein adapted to receive and pivotally hold said projections, whereby when mounted in said end clips each of said panel members may be pivoted about said projections into a fixed desired position said device being mounted adjacent a window of said vehicle in a position to reduce glare passing through said window.

2. A structure as specified in claim 1 in which each of the panel members are of different height and in which the smallest panel member is placed on top of the plurality of members so that it will be the first which can be raised into an up position.

3. The structure of claim 1 where there are three panel members, the first of said panel members having a maximum height of 2½", the second panel member having a maximum height of 3½", and the third panel member having a maximum height of 4½".

4. The structure of claim 1 wherein each of said end clips comprises a front wall and a side wall, said front wall extending in a direction generally parallel to the pivot axis of said panel members and said side wall extending in a direction transverse to said pivot axis, said side wall being bent towards the sides of said panel members sufficiently to bear against and support said sides when said panel members are pivoted into said fixed desired position.

5. A structure as specified in claim 4 in which the opening is positioned in the side wall of each end clip and in which the rim at the top of the opening slopes so as to form an acute angle with the front wall and in which the said rim at the top of the opening bears against the said projections when said panel members are down in a substantially horizontal position.

6. A structure as specified in claim 4 in which the opening is positioned in the side wall, said opening having a rim comprising a substantially vertical section positioned at the front and at the rear thereof and a top sloping section which slopes downwardly from the rear to the front section to connect the two, said top sloping section being arranged to bear against the said projections when the panel members are down in substantially horizontal position.

References Cited

UNITED STATES PATENTS

| | | | |
|---|---|---|---|
| 1,717,185 | 6/1929 | Caldwell | 296—97 |
| 2,187,027 | 1/1940 | Harvey | 296—97 |
| 2,596,397 | 5/1952 | Greig et al. | 296—97 |
| 2,622,922 | 12/1952 | Schroeder | 296—97 |
| 2,625,935 | 1/1953 | Marano | 40—102 X |
| 3,022,109 | 2/1962 | Hauskama | 296—97 |

BENJAMIN HERSH, *Primary Examiner.*

J. A. PEKAR, *Assistant Examiner.*